United States Patent
Narayanam et al.

(10) Patent No.: US 10,285,080 B2
(45) Date of Patent: *May 7, 2019

(54) USING SYNERGISTIC SHAPELY VALUES TO INCREASE ROBUSTNESS OF A CELLULAR NETWORK

(71) Applicant: International Business Machines Corporation, Armonk, NY (US)

(72) Inventors: Krishnasuri Narayanam, Bangalore (IN); Ramasuri Narayanam, Bangalore (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,851

(22) Filed: May 16, 2018

(65) Prior Publication Data

US 2018/0262927 A1  Sep. 13, 2018

Related U.S. Application Data

(63) Continuation of application No. 15/675,905, filed on Aug. 14, 2017, now Pat. No. 10,057,791, which is a
(Continued)

(51) Int. Cl.
*H04W 72/00* (2009.01)
*H04W 24/02* (2009.01)
(Continued)

(52) U.S. Cl.
CPC ......... *H04W 24/02* (2013.01); *H04L 41/0668* (2013.01); *H04L 41/12* (2013.01);
(Continued)

(58) Field of Classification Search
CPC ..... H04W 24/02; H04W 16/18; H04W 24/04; H04L 41/12; H04L 41/145
(Continued)

(56) References Cited

U.S. PATENT DOCUMENTS 7,504,936 B2  3/2009  Miller et al.
7,768,929 B2  8/2010  Karacali-Akyamac et al.
(Continued)

FOREIGN PATENT DOCUMENTS

WO  WO 2014162147  10/2014

OTHER PUBLICATIONS

Mitra et al., Trajectory Aware Macro-cell Planning for Mobile Users, Jan. 14, 2015, ar:Xiv:1501.02918v2 [cs.NI], 14 pages.
(Continued)

*Primary Examiner* — Huy C Ho
(74) *Attorney, Agent, or Firm* — Schmeiser, Olsen & Watts, LLP; Mark Vallone

(57) ABSTRACT

A method and associated systems for improving robustness of a cellular network. A topology of the cellular network is represented as an undirected graph that represents base stations as nodes and represents communication paths between base stations as edges. Each node is associated with a "synergistic" version of a Shapley value proportional to an amount of network disturbance that would occur if that value's corresponding base station should fail. The synergistic nature of the synergistic Shapley values allows them to account for scenarios in which multiple base stations fail at the same time. A synergistic Shapley value of a particular node is derived as a function of how many of the shortest paths between nodes of the graph lengthen when the node's corresponding base station fails. Base stations and nodes associated with higher synergistic Shapley values are deemed to be "censorious" and in need of reconfiguration.

20 Claims, 5 Drawing Sheets

Related U.S. Application Data continuation of application No. 15/188,529, filed on Jun. 21, 2016, now Pat. No. 9,794,805.

(51) Int. Cl.
*H04L 12/24* (2006.01)
*H04W 16/22* (2009.01)
*H04W 16/18* (2009.01)
*H04W 24/04* (2009.01)

(52) U.S. Cl.
CPC ........... *H04W 16/18* (2013.01); *H04W 16/22* (2013.01); *H04W 24/04* (2013.01)

(58) Field of Classification Search
USPC ........................................................ 455/450
See application file for complete search history.

(56) References Cited

U.S. PATENT DOCUMENTS

| | | | |
|---|---|---|---|
| 8,861,331 B2 | 10/2014 | Abbasi et al. | |
| 8,923,134 B2 | 12/2014 | Meredith et al. | |
| 9,794,805 B1 | 10/2017 | Narayanam et al. | |
| 2006/0136468 A1 | 6/2006 | Robison | |
| 2008/0151821 A1 | 6/2008 | Cho et al. | |
| 2013/0182612 A1* | 7/2013 | Bemont | H04L 45/00 370/255 |
| 2014/0222490 A1* | 8/2014 | Kenkre | G06Q 10/06313 705/7.23 |
| 2015/0033084 A1 | 1/2015 | Sasturkar et al. | |
| 2015/0180705 A1* | 6/2015 | Beheshti-Zavareh | H04L 45/64 370/218 |
| 2016/0359592 A1 | 12/2016 | Kulshreshtha et al. | |
| 2018/0027428 A1 | 1/2018 | Narayanam et al. | |

OTHER PUBLICATIONS

Notice of Allowance (dated Jun. 12, 2017) for U.S. Appl. No. 15/188,529, filed Jun. 21, 2016.
Notice of Allowance (dated Apr. 16, 2018) for U.S. Appl. No. 15/675,905, filed Aug. 14, 2017.

\* cited by examiner

USING SYNERGISTIC SHAPELY VALUES TO INCREASE ROBUSTNESS OF A CELLULAR NETWORK

This application is a continuation application claiming priority to Ser. No. 15/675,905, filed Aug. 14, 2017, now U.S. Pat. No. 10,057,791 issued Aug. 21, 2018, which is a continuation application of Ser. No. 15/188,529, filed Jun. 21, 2016, U.S. Pat. No. 9,794,805, issued Oct. 17, 2017.

TECHNICAL FIELD

The present invention relates to improving reliability of cellular networks by mitigating adverse effects a technical problem that disables a base station.

BACKGROUND

In a cellular network, data is transmitted between cellular base stations distributed throughout geographical region covered by the network. A base station failure may force data to be rerouted through a lengthier, less-efficient, or more congested path. Because a large cellular network may comprise very large numbers of base stations, one technical problem inherent in cellular technology is the difficulty in organizing base stations so as to minimize the impact of a failure. In particular, the complex topology of a typical cellular network makes it hard to identify which base station failures would be must disruptive. This problem becomes far more challenging when attempting to consider the possibility of multiple concurrent base-station failures.

BRIEF SUMMARY

A first embodiment of the present invention provides network-optimization system comprising a processor, a memory coupled to the processor, and a computer-readable hardware storage device coupled to the processor, the storage device containing program code configured to be run by the processor via the memory to implement a method for improving robustness of a cellular network, the method comprising:

receiving an undirected graph that represents a topology of a cellular network, where the graph represents a pair of base stations of the network as a pair of nodes, and where the graph represents a communications path between the pair of base stations as an edge connecting the pair of nodes;

deriving, for each node of the graph, a corresponding Shapley value of a plurality of Shapley values;

identifying a first node of the graph as a censorious node if a Shapley value that corresponds to the first node exceeds a predetermined threshold value; and updating the graph by rearranging one or more censorious nodes of the graph so as to reduce the Shapley values that correspond to the one or more censorious nodes.

A second embodiment of the present invention provides method for improving robustness of a cellular network, the method comprising:

receiving an undirected graph that represents a topology of a cellular network, where the graph represents a pair of base stations of the network as a pair of nodes, and where the graph represents a communications path between the pair of base stations as an edge connecting the pair of nodes;

deriving, for each node of the graph, a corresponding Shapley value of a plurality of Shapley values;

identifying a first node of the graph as a censorious node if a Shapley value that corresponds to the first node exceeds a predetermined threshold value; and updating the graph by rearranging one or more censorious nodes of the graph so as to reduce the Shapley values that correspond to the one or more censorious nodes.

A third embodiment of the present invention provides a computer program product, comprising a computer-readable hardware storage device having a computer-readable program code stored therein, the program code configured to be executed by a network-optimization system comprising a processor, a memory coupled to the processor, and a computer-readable hardware storage device coupled to the processor, the storage device containing program code configured to be run by the processor via the memory to implement a method for improving robustness of a cellular network, the method comprising:

receiving an undirected graph that represents a topology of a cellular network, where the graph represents a pair of base stations of the network as a pair of nodes, and where the graph represents a communications path between the pair of base stations as an edge connecting the pair of nodes;

deriving, for each node of the graph, a corresponding Shapley value of a plurality of Shapley values;

identifying a first node of the graph as a censorious node if a Shapley value that corresponds to the first node exceeds a predetermined threshold value; and updating the graph by rearranging one or more censorious nodes of the graph so as to reduce the Shapley values that correspond to the one or more censorious nodes.

DETAILED DESCRIPTION

Embodiments of the present invention may be used to optimize any sort of network or arrangement of connected nodes that may be represented as a directed or undirected graph. Embodiments and examples contained in this document describe, for pedagogical reasons, applications in the field of cellular-networking technology, but they should not be construed to limit the scope of the present invention to cellular networks. Other embodiments may, for example, be straightforwardly applied to computer LANs, cloud-based infrastructure, interpersonal communications networks, social networks, electronic media-distribution channels, supply-chain networks, or any other types of entities that may represented as a directed or undirected graph. Furthermore, although examples and embodiments described in this document disclose methods of optimizing organizations of macrocells in a cellular network, other embodiments related to cellular-network technology might be instead optimize organizations of other entities of a cellular network, such as microcells or femtocells.

In a cellular network, data is transmitted between base stations distributed throughout a geographical region covered by the network. A base station failure may force data that it would otherwise have managed to be rerouted through a lengthier, less-efficient, or more congested path. Because a large cellular network may comprise very large numbers of base stations, one technical problem inherent in cellular technology is the difficulty in organizing base stations so as to minimize the impact of a failure.

In particular, the complex topology of a typical cellular network makes it hard to identify which base station failures would be most disruptive by, for example, forcing network traffic through a longer or less-efficient path or by increasing the lengths of the shortest routes between pairs of other base stations. This identification problem becomes far more challenging when attempting to account for the possibility of multiple concurrent base-station failures.

Figure 2:
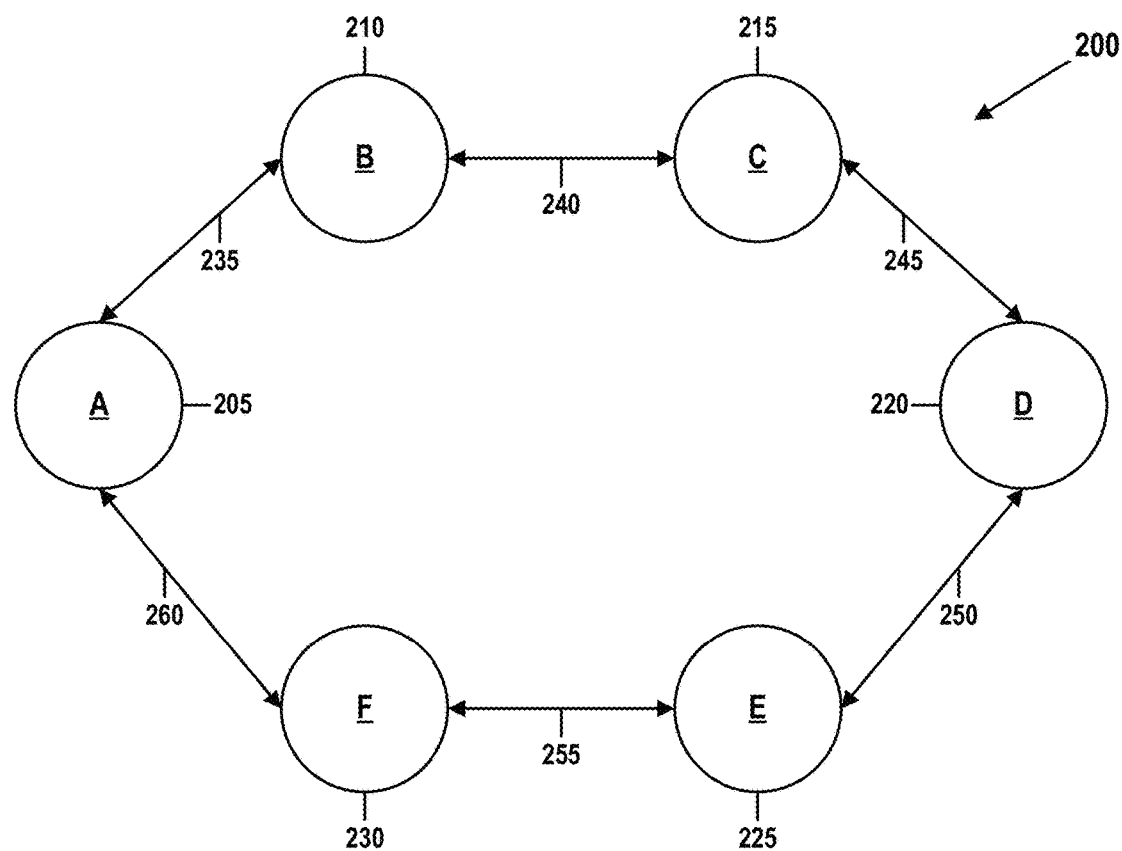
FIG. 2 is an undirected graph, representing an organization of a six-macrocell cellular network, that may be optimized by embodiments of the method of the present invention.

A macrocell of a cellular network may be the largest logical unit of radio coverage supported by the network, and may encompass the coverage area of a cell tower, or "base station." Each macrocell receives data from and sends data to one or more adjacent macrocells, and the overall organization of macrocells in a cellular network, or in a subset of a cellular network, may be represented topologically as an undirected graph. In this document, a node of such a graph may equivalently represent a macrocell, a base station, or a cell tower. FIG. 2 shows an example of such a graph.

When a base station fails or becomes so congested that its corresponding macrocell no longer operates satisfactorily, a telecom carrier responsible for the cellular network may need to quickly identify the failing base station and reroute traffic around that base station. A poorly designed network will comprise numerous "censorious" base stations that, when failing, have the greatest negative impact upon the network, thus creating the greatest burdens.

The term "censorious" may be a qualitative term that merely describes a base station or macrocell that, upon failure, creates an unacceptable degree of negative impact upon the network. Embodiments of the present invention, on the other hand, use quantitative measures to more deterministically identify censorious base stations. These implementation-dependent measures may, for example, comprise identifying a base station as censorious as a function of whether its failure would cause more than a certain number of network paths to be lengthened.

Figure 4:
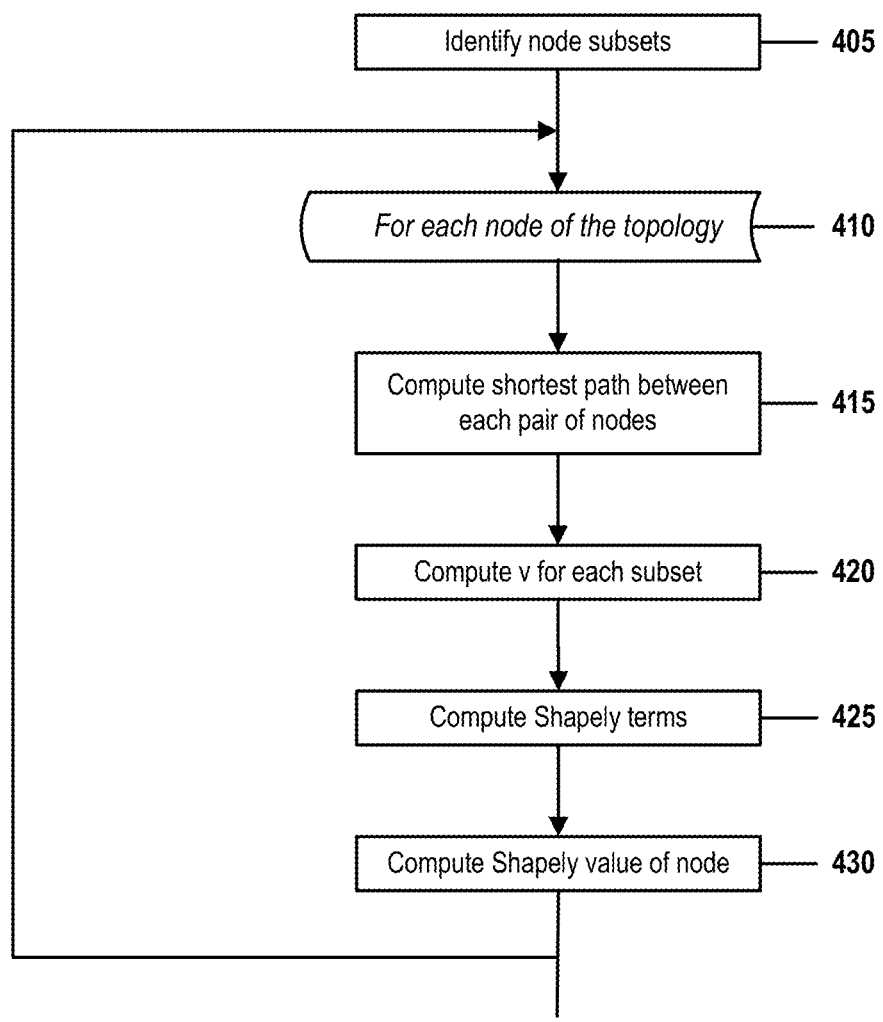
FIG. 4 shows details of a method for computing synergistic Shapley values of nodes of a graph in accordance with embodiments of the present invention.

More specifically, embodiments of the present invention identify censorious entities, such as base stations or macrocells, by assigning each one an enhanced version of a synergistic Shapley value parameter. synergistic Shapley values are known to those skilled in the art of game theory as a means of assigning a unique distribution of a total surplus of a resource generated by a coalition of all players. The present invention's enhanced "synergistic" synergistic Shapley value extends this concept in a novel manner and applies it in a novel manner as a way to identify the negative impact when multiple base stations fail at the same time. These synergistic Shapley values are proportional to both a decrease in network connectivity and a decrease in the quality of service, when one or more base stations fails. FIG. 4 describes how to compute synergistic Shapley values.

Embodiments of the present invention may identify censorious macrocells as those macrocells associated with synergistic Shapley values that exceed a certain threshold value. The exact value of this threshold is implementation-dependent, and may be selected by one skilled in the art or in possession of expert knowledge of an embodying application, of resource, infrastructure, or system constraints, or of a goal or intent of the embodiment.

As mentioned above, a synergistic Shapley value is proportional to a value of a censorious attribute of a macrocell or base station. A first macrocell that is censorious will, all other things equal, be associated with a higher synergistic Shapley value than does a second macrocell that is not deemed censorious.

A macrocell or base station may be considered censorious when the placement of the macrocell or base station in a cellular network is not optimal. Reorganizing the network, to reconfigure the way that base stations or macrocells connect to each other, can significantly alter some or all macrocells' synergistic Shapley values. Embodiments of the present invention, may thus, by identifying censorious macrocells, help designers and maintenance personnel using means known in the art to reorganize a network to reduce a total number of censorious macrocells, or to reduce synergistic Shapley values associated with certain important macrocells.

In one class of embodiments, synergistic Shapley values of a current cellular network are compared to other "what-if" sets of synergistic Shapley values (computed by a method of the present invention) of alternate network topologies that connect the same base stations in different ways. In some cases, the what-if topologies may vary only in their placement of macrocells known to be censorious, especially important, or most problematic.

An optimal, or most efficient, network topology may be identified as one that comprises the lowest number of censorious macrocells or that is associated with the lowest overall synergistic Shapley values. Such embodiments not only identify censorious macrocells, but also identify a way to reconfigure the network so as to reduce the risk posed by such censorious macrocells, or even so as to render then noncensorious.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
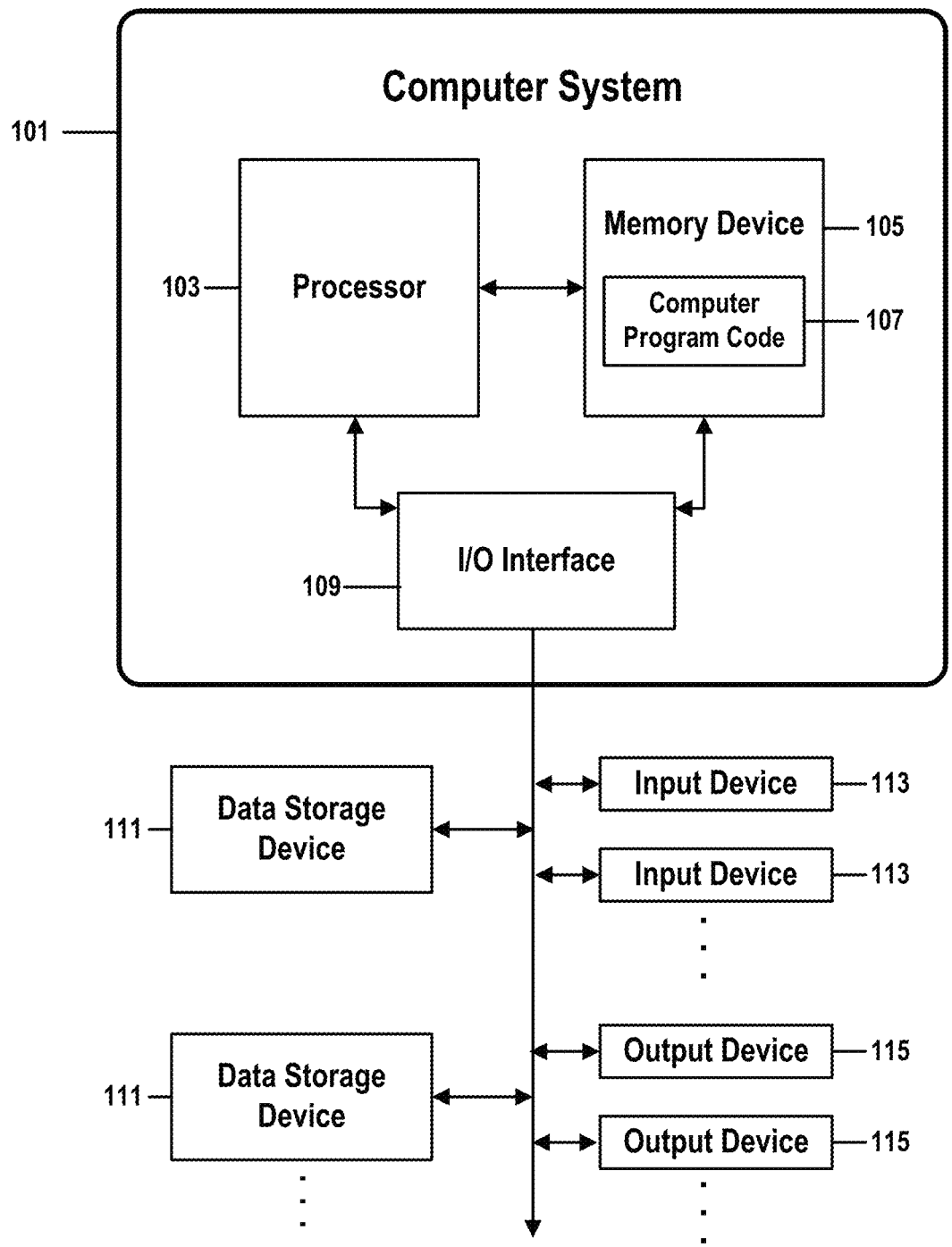
FIG. 1 shows the structure of a computer system and computer program code that may be used to implement a method for improving robustness of a cellular network in accordance with embodiments of the present invention.

FIG. 1 shows a structure of a computer system and computer program code that may be used to implement a method for improving robustness of a cellular network in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for improving robustness of a cellular network in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for improving robustness of a cellular network.

Any of the components of the present invention could be created, integrated, hosted, maintained, deployed, managed, serviced, supported, etc. by a service provider who offers to facilitate a method for improving robustness of a cellular network. Thus the present invention discloses a process for deploying or integrating computing infrastructure, comprising integrating computer-readable code into the computer system 101, wherein the code in combination with the computer system 101 is capable of performing a method for improving robustness of a cellular network.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for improving robustness of a cellular network may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for improving robustness of a cellular network is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 is an undirected graph 200, representing an organization of macrocells of a cellular network, that may be optimized by embodiments of the method of the present invention. FIG. 2 comprises elements 200-260.

Vertices or nodes 205-230 each represent a macrocell (or a base station) of the cellular network. These macrocells are respectively labeled as nodes A-F.

Edges 235-260 each represent a bidirectional communication path between a pair of macrocells represented respectively by nodes 205-230. In this document, an edge may be labeled by the nodes it connects. For example, edge BC 240 connects node B 210 to node C 215.

The graph of FIG. 2 represents a simplified network in which each node is connected to only its two adjacent nodes. An equivalent graph representing a real-world cellular network, however, might contain a large number of nodes arranged in a complex web of interconnections. In some networks, a node may be connected to more than two other nodes.

In this example, network traffic from node A 205 to node D 220 can travel along either path ABCD (through edges 235-245), or along path AFED (through edges 250-260). Either path has a length of 3 nodes because the path passes through three nodes in order to reach node D 220.

If node B 210 fails, traffic between A 205 and D 220 can still travel through path AFED, so the length of the shortest path for such traffic does not change. But, if both B 210 and F 230 fail, the length of the shortest path increases (here, to an infinite value, since there is no longer any direct or indirect path between A 205 and D 220).

Similarly, network traffic between node B 210 and F 230 can travel along either path BAF (through edges 235 and 260), or along path BCDEF (through edges 240-255). The shortest path BAF has a length of 2 nodes, and the longer path BCDEF has a length of 4.

If any combination of nodes C 215, D 220, or E 225 fails, traffic between B 210 and F 230 can still travel through the shortest BAF path, so the length of the shortest path in such case does not change. But if node A 205 fails, the length of the shortest path between B 210 and F 230 increases because the only remaining viable path is BCDEF.

In this simple example, the censorious nature of some nodes can be mitigated by adding a new path AD (not shown in the figure) between node A 205 and node D 220. The result of adding such a path is that a failure by any combination of the other four nodes B 210, C 215, E 225, or F 230 will no longer lengthen the shortest path between node A 205 and node D 220 because the new path AD will remain the shortest possible path between A 205 and D 220. But because adding a new path may consume significant network resources, it would generally be impossibly resource-intensive and impossibly complex to eliminate censorious nodes in a real-world cellular network by simply connecting every node to every other node.

Embodiments of the present invention, as described in the remaining figures, solve this technical problem through a novel method based on computation of synergistic Shapley values.

Figure 3:
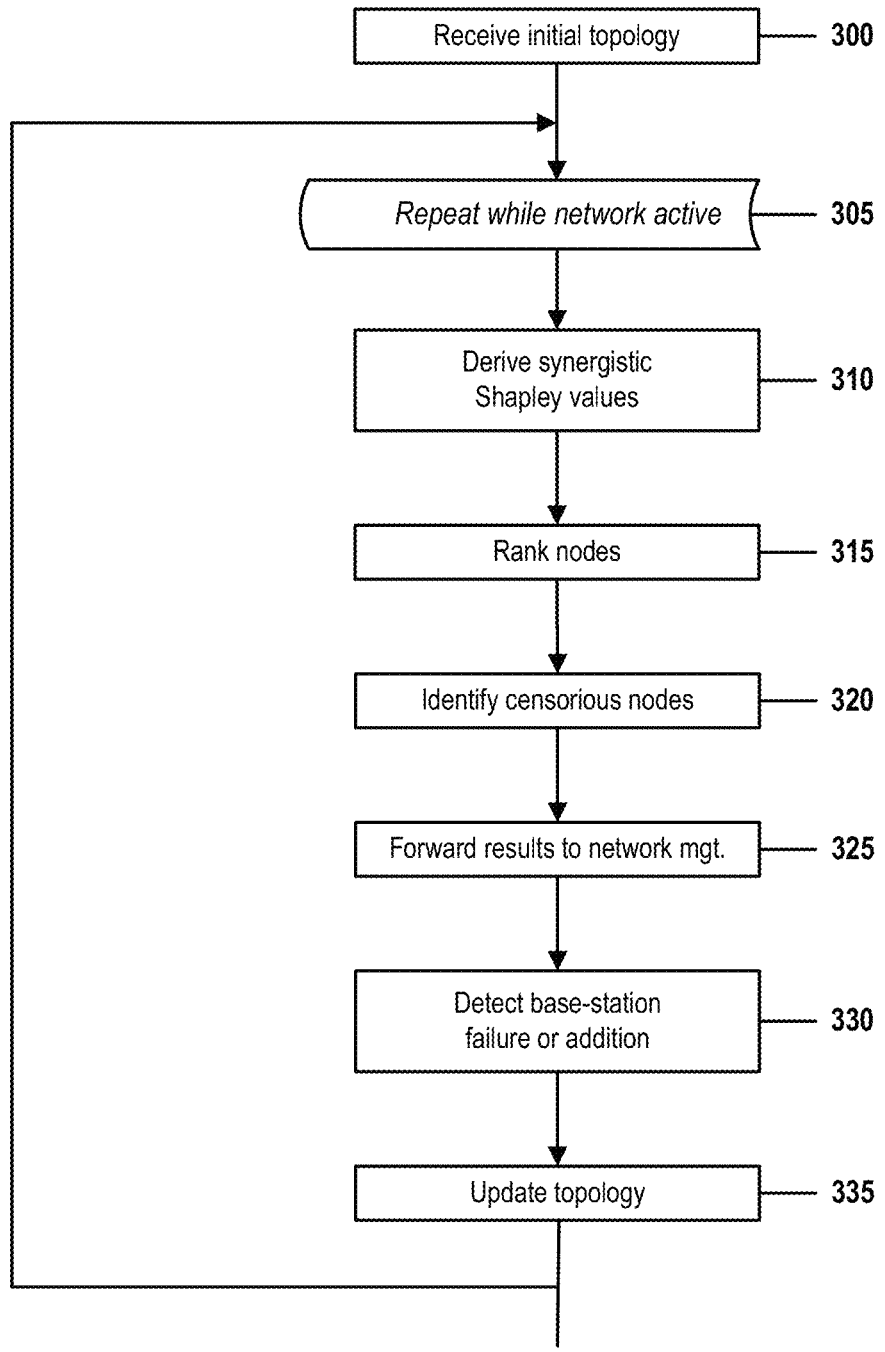
FIG. 3 is a flow chart that illustrates the steps of a method for improving robustness of a cellular network in accordance with embodiments of the present invention.

FIG. 3 is a flow chart that illustrates steps of a method for improving robustness of a cellular network in accordance with embodiments of the present invention. FIG. 3 comprises steps 300-335.

In step 300, a processor of a computerized network-optimization system receives a representation of a topology of a cellular network. This representation may be in a format similar to that shown in FIG. 2, in which a base station, macrocell, cell tower, or other type of entity comprised by the cellular network is represented as a node or vertex of a directed or undirected graph. For the sake of readability, these represented entities will be referred to here as "base stations," but these references should not be construed to limit embodiments of the present invention to only base stations.

The graph further represents a communication path between a pair of the base stations as an edge that connects a pair of nodes that represent the pair of base stations.

Step 305 initiates an optional iterative procedure of steps 305-335. In embodiments that comprise this iterative procedure, the procedure repeats every time there is a change to the set of base stations comprised by the cellular network. In other embodiments, the method of FIG. 2 may end after a single performance of steps 310-325.

In step 310, the processor performs computations to derive a synergistic Shapley value for each node of the received graph. This procedure is described in greater detail in FIGS. 4 and 5.

In step 315, the processor ranks the nodes of the graph as a function of their corresponding synergistic Shapley values. Although the order of the ranking is implementation-dependent, embodiments described here rank the nodes in decreasing order of synergistic Shapley value.

In step 320, the processor identifies censorious nodes of the graph as a function of the synergistic Shapley values derived in step 310. This function may be implementation-dependent, using methods known in the art to infer from the synergistic Shapley values or from the ranking which nodes are sufficiently problematic to justify an attempt to reconfigure them.

For example, in embodiments where resource constraints limit the number of nodes that can be reconfigured, censorious nodes may be arbitrarily identified as those corresponding to the highest 1% of the synergistic Shapley values computed in step 310. In another case, censorious nodes may be deemed to be those nodes corresponding to the 100 highest synergistic Shapley values.

Other methods of selecting censorious nodes to be identified by an embodiment might include selecting nodes that are associated with synergistic Shapley values that exceed a predetermined threshold value or fall within a predefined range of values. In yet other cases, a censorious node might be identified as one that satisfies a predetermined combination of conditions, such as being associated with a higher synergistic Shapley value and being physically located in a high-traffic geographical region or a hub city.

Many other methods are possible, and may be chosen as a function of expert knowledge of the cellular network or its underlying technology, or as a function of other implementation-dependent factors known to those skilled in the art.

In step 325, the processor may forward a list of the censorious nodes identified in step 320 to a network-management entity. This network-management entity may be a computerized network-configuration or network-maintenance entity capable of rerouting network traffic or of integrating the list of censorious nodes into network-configuration or network-utilization analyses, reports, or proscriptive measures.

In other embodiments, the processor may forward the list of censorious nodes to a human network administrator or other person charged with ensuring the continued operation of the cellular network.

In either case, the entity receiving the list of censorious nodes may in response generate a report or adjust the topology of the network to reduce the number of censorious nodes or to reduce a degree of risk (which is proportional to each node's synergistic Shapley value) incurred by the existence of the censorious nodes.

In some embodiments, the method of FIG. 3 ends with step 225. But other embodiments may continue beyond these steps, proceeding to step 330 when the processor receives notice of a change in the set of base stations.

In step 330, the processor receives notice of a change in the set of base stations. This change may comprise an addition to the set, as might occur when a new cell tower is brought online or when a previously malfunctioning or partially functioning tower returns to service. This change may also comprise a deletion to the set of base stations, as might occur when an existing tower fails or becomes temporarily unavailable while undergoing scheduled maintenance.

In step 335, the processor may update the graph that represents the current topology of the cellular network. In some embodiments, the processor may instead receive an updated graph. In either case, the updated graph represents the cellular network as a graph (just as the previous graph did in step 300), and the updating comprises adding a node to or deleting a node from the graph, where the added or deleted nodes represents the base station added to or deleted from the cellular network in step 330.

In some cases, the updated graph may further comprise alterations to one or more edges of the graph, representing that the network topology has been revised in order to reroute data in response to the adding or deleting of base stations. In some embodiments, rerouting may occur if, for example, a failure of a first base station completely isolates a second base station.

In embodiments that comprise the iterative procedure of steps 305-335, the next iteration of the iterative procedure would begin with step 310. The iterative procedure would then continue as before, deriving synergistic Shapley values for the updated network topology and then identifying censorious nodes to an extrinsic network-management entity. The processor would then wait until it received notification of another change to the set of base stations represented by the current, updated, version of the graph.

FIG. 4 shows details of a method for computing synergistic Shapley values of nodes of a graph in accordance with embodiments of the present invention. FIG. 4 describes step 310 of FIG. 3 in greater detail. FIG. 4 comprises steps 405-430. FIG. 4 should be read in conjunction with FIG. 5, which depicts an exemplary cellular network and undirected graph used by a running example that follows the steps of FIG. 4.

Figure 5:
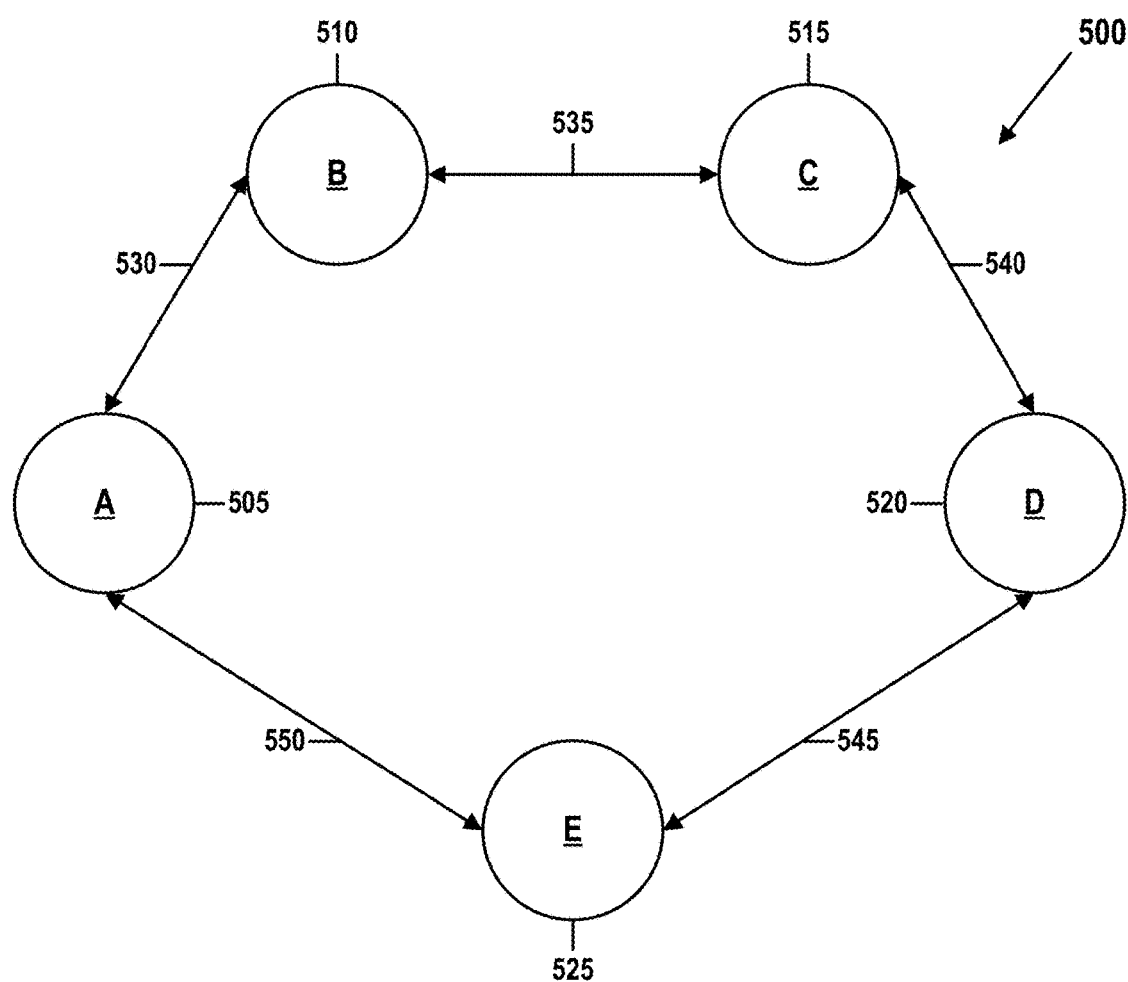
FIG. 5 is an undirected graph representing an organization of a five-macrocell cellular network that may be optimized by embodiments of the method of the present invention.

FIG. 5 is an undirected graph 500, representing an organization of a five-macrocell (or five base-station) cellular network, that may be optimized by embodiments of the method of the present invention. FIG. 5 comprises elements 500-550.

FIG. 5 illustrates an exemplary five-node representation of the cellular network. Elements of FIG. 5 are similar in form and function to corresponding elements of the six-node graph of FIG. 2. Here, nodes 505-525 each represent a macrocell (or a base station) of the cellular network. These base stations are respectively labeled as nodes A-E.

Edges 530-550 each represent a bidirectional communication path between a pair of macrocells represented respectively by one pair of nodes 505-525. Using the naming convention of FIG. 2, edge BC 535, for example, connects node B 510 to node C 515.

The network represented by five-node graph 500 may comprise a small, five base-station, subnetwork of a cellular network organized in a ring topology similar to that of the six-node network of FIG. 2. The graph of FIG. 5 contains five nodes, labeled A 505, B 510, C 515, D 520, and E 525, which are connected by paths AB 530, BC 535, CD 540, DE 545, and EA 550.

As described in FIG. 3, embodiments of the present invention identify "censorious" or problematic nodes of a network topology that is represented as a directed or undirected graph. This identification is performed by computing novel "synergistic Shapley values" of each node and then ranking the nodes as a function of each node's corresponding computed synergistic Shapley value.

A conventional Shapley value is a concept of game theory used when a goal of a game is to fairly distribute gains and costs to a set of actors working collaboratively. The Shapley value applies primarily in situations when the contributions of each actor are unequal. In such cases, deriving a Shapley value for each actor provides a weighting that ensures that each actor gains at least as much as that actor would have gained by acting alone. Shapley values have been described profusely over the years in publications related to the field of game theory and have been applied in a variety of other fields. In the field of economics, for example, a Shapley value may be characterized as an expectation of a marginal value or contribution. In general, a Shapley value is expressed as a fraction.

The present invention comprises a novel application of the concept of synergistic Shapley values in order to identify how much disruption to a network would occur when a particular node of that network becomes unavailable. In embodiments of the present invention, the Shapley computation is extended to account for the effect of scenarios in which multiple nodes become unavailable at the same time. These enhanced, "synergistic," synergistic Shapley values may be computed by the method of FIG. 4.

A common expression of a function $\phi i$ that returns a Shapley value of a player I is:

$$\phi_i(v) = \sum_{C \subseteq N-i} \frac{|C|!(n-|C|-1)!}{n!} \{v(C \cup \{i\}) - v(C)\} \quad (1)$$

Here:
N is a set of players,
n is a total number of players in N,
i is a player comprised by N,
C is a subset of N that consists of players working in collaboration, and
|C| is the number of collaborating players in a subset C.

A conventional game-theory application of Eq. (1) may comprise using the equation to compute a Shapley value for a player i as a sum taken over all subsets N−i (all subsets of N that do not include player i). As is known in the field of mathematics, the number of distinct subsets C (N−i) is equal to the number of combinations of n objects taken |C| at a time. Function v(C), as it is known in the art, returns a "coalition worth" value of subset C.

Embodiments of the present invention apply an analogous computation to produce a synergistic Shapley value of a node i that may be ascribed meaning within the context of the present invention. For example, embodiments described below interpret v(C) in a novel manner in order to add "synergistic" weighting to derived synergistic Shapley values (that is, to adjust a synergistic Shapley value of a cellular network to account for concurrent multiple base-station failures).

For example, in the six-node graph of FIG. 2, an embodiment of the present invention might be used to derive synergistic Shapley values for one node i. Here, the set of all players N would the set of all nodes (A, B, C, D, E, F), n would equal 6 (the number of nodes in N), and each subset C would be a subset of N that does not include node i.

In this example, if Eq. (1) is used to derive a synergistic Shapley value for i=node A 205, the equation might produce terms for an empty subset (|C|=0), for each of the five subsets that contain one node (|C|=1) but do not contain node A 205, and so forth, through a final, sixth, pass that processes the single five-node subset (C=5) that does not contain node A 205.

In embodiments of the present invention, the function v(C) returns a value for each subset C of nodes. This value is equal to the number of pairs of nodes in N for which the shortest path between each pair of nodes increases when all the nodes of subset C become nonfunctional.

For example, if subset C={BD}, v(C) returns the number of base-station pairs that would be forced to exchange data through a longer path should node B 210 and node D 220 both become inoperable. Here, the shortest path between node A 205 and node C 225 lengthens (that is, the shortest path between those two nodes becomes impossible). Due to similar reasons, the shortest path between node C 215 and E 225 lengthens and the shortest path between node C 215 and node F 230 also lengthens. Neither the shortest path between nodes A 205 and D 220, nor the shortest path between nodes D 220 and E 225 lengthens. Because the shortest paths between three pairs of nodes lengthen when the nodes in subset {BD} simultaneously fail, v(C)=v({BD})=3. Further examples of function v( ) are presented in greater detail below, in the running example based on FIG. 5.

A synergistic Shapley value for any node i of set N, as computed by Eq. (1), is thus proportional to: (i) a decrease in connectivity of the network N when the base station corresponding to node i becomes nonoperational; and (ii) a decrease in the network's overall quality of service when the base station corresponding to node i becomes nonoperational.

Embodiments of the present invention therefore apply the Shapley function in a novel way by deeming base stations of a cellular network to be collaborating players of a game governed by the theorems of game theory, and in this way use the Shapley function to produce values that are proportional to how potentially problematic (or censorious) is each base station of the network.

In step 405, the processor, having received a graph that represents a topology of all or part of the cellular network, enumerates all possible subsets of nodes of the received graph.

In the running example where the received graph is the five-node graph 500 of FIG. 5, this enumeration might be organized into five groups of subsets (grouped solely for pedagogical reasons as a function of the number of elements |C| in each subset C):

- (|C|=0): { }
- (|C|=1): {A} {B} {C} {D} {E}
- (|C|=2): {AB} {AC} {AD} {AE} {BC} {BD} {BE} {CD} {CE} {DE}
- (|C|=3): {ABC} {ABD} {ABE} {ACD} {ACE} {ADE} {BCD} {BCE} {BDE} {CDE}
- (|C|=4) {ABCD} {ABCE} {ABDE} {ACDE} {BCDE} and
- (|C|=5) {ABCDE}.

One way to conceptualize this enumeration is as a list of combinations of n objects taken |C| at a time, where n is the total number of nodes (5) comprised by the set of all nodes N, and |C| is the number of nodes in any subset C⊂N.

Step 410 begins an iterative procedure of steps 410-430. This iterative procedure is performed once for each node in the received graph. In the running example that processes the topology of FIG. 5, this iterative procedure would be performed five times, once each for nodes A 505, B 510, C 515, D 520, and E 525.

The description of FIG. 4 presented in this document will, for illustrative purposes, walk through this iterative procedure once, showing how to derive a synergistic Shapley value for node B 510. In a full implementation, four other iterations of the iterative procedure would each perform analogous operations on each of the other four nodes in order to compute synergistic Shapley values for those other four nodes. Steps 315-320 of FIG. 3 would then rank and compare the five values in order to identify censorious nodes.

In step 415, the processor begins a sequence of steps that evaluate Eq. (1) in order to derive a synergistic Shapley value for node i. In the running example, node i, during the current iteration of the iterative procedure of steps 410-430, is node B 210 of the graph of FIG. 5.

This sequence of steps begins with the processor identifying the shortest path between each pair of nodes of the set N of all nodes. In our running example, N consists of all nodes represented by the graph of FIG. 5: {A, B, C, D, E}. These computations may be performed by any means known in the art, such as by an algorithm that identifies shortest path lengths by counting nodes as it traverses a graph.

In one example, the shortest path between nodes A 505 and B 510 is deemed to have a length of 1 because the shortest path traverses only one node. Similarly, the shortest path between nodes A 505 and C 515 has a length of 2 because the first link on the shortest path connects node A 505 to node B 510 and the second link on the shortest path connects node B 510 to node C 515. And the shortest path between node B 510 and node D 520 has a length of 2 because the shortest path between those two nodes must pass through node C 515 and node D 520. The shortest lengths of all other subsets C are computed in the same manner.

In some embodiments, step 415 may be performed at a different point in a method of FIG. 3 or FIG. 4, or may be combined with another step, such as step 420. In some embodiments, this step 415 may be performed only to facilitate a performance of step 420, or only to enumerate all possible subsets C. The enumeration of step 415 is presented here as a distinct step, performed at a distinct point in a method of FIG. 4, solely in order to facilitate a clear explanation of the steps required to derive synergistic Shapley values in accordance with embodiments of the present invention.

In step 420, the processor computes v(C) for each subset C enumerated in step 400. As described above, function v(C) returns a value for each subset C of the set of nodes N. As interpreted by embodiments of the present invention, v(C) returns the number of node pairs of N for which the shortest path increases in length when all the nodes in C are removed from the graph. If, for example, the shortest paths between three pairs of nodes increase in length when all the nodes of C are removed from the graph, then v(C)=3.

For example, a failure of node B 510 of FIG. 5 blocks traffic through node B 510, making impossible the previously shortest path from A 505 to C 515 through B 510. A new shortest path from A 505 to C 515 must now pass through nodes D 520 and E 525, resulting in a lengthening of the shortest path between node A 505 and C 515. The function v({B}) thus returns a value of 1, the number of shortest paths between other pairs of nodes that lengthens.

In the running example based on the five-node graph of FIG. 5, the processor enumerated 32 distinct subsets C⊂N in step 400. Computing v(C) for these subsets yields the following values of v( ):

| | | | | |
|---|---|---|---|---|
| v({ }) = 0 | v({A, B, C, D, E}) = 0 | | | |
| v({A}) = 1 | v({B}) = 1 | v({C}) = 1 | v({D}) = 1 | v({E}) = 1 |
| v({A, B}) = 0 | v({A, C}) = 2 | v({A, D}) = 2 | v({A, E}) = 0 | v({B, C}) = 0 |
| v({B, D}) = 2 | v({B, E}) = 2 | v({C, D}) = 0 | v({C, E}) = 2 | v({D, E}) = 0 |
| v({A, B, C}) = 0 | v({A, B, D}) = 1 | v({A, B, E}) = 0 | v({A, C, D}) = 1 | v({A, C, E}) = 1 |
| v({A, D, E}) = 0 | v({B, C, D}) = 0 | v({B, C, E}) = 1 | v({B, D, E}) = 1 | v({C, D, E}) = 0 |
| v({A, B, C, D}) = 0 | v({A, B, C, E}) = 0 | v({A, B, D, E}) = 0 | v({A, C, D, E}) = 0 | v({B, C, D, E}) = 0 |

In step 425, the processor, by inserting the previously derived values into Eq. (1), determines a term of a synergistic Shapley value for node I (node B 510), where each of these terms corresponds to a subset C−i of set N={A, B, C, D, E}.

In our running example, subset C may thus be any of the following 16 subsets, none of which include node B 510: { }, {A}, {C}, {D}, {E}, {A,C}, {A,D}, {A,E}, {C,D}, {C,E}, {D,E}, {A,C,D}, {A,C,E}, {A,D,E}, {C,D,E}, {A,C,D,E}. As above, these subsets are organized, for pedagogical purposes, into groups that each contain all subsets that have a same number of elements.

Plugging values of n=5, i=node B 210, and N={A,B,C,D,E} into Eq. (1) yields the following 16 terms of a synergistic Shapley value of node B 210, each of which corresponds to one subset C−i and each of which represents one term over which is summed Eq. (1):

|C|=0:
  C={ }(empty set): [0! (5−0−1)!/5!]*[v({B})−v({ }]= [4!/5!]*[1−0]=24/120

|C|=1:
  C={A}: [1! (5−1−1)!/5!] *[v({A,B})−v({A})]=[3!/5!] *[0−0]=0
  C={C}: [1! (5−1−1)!/5!] *[v({C,B})−v({C})]=[3!/5!] *[0−1]=6/120 (−1)
  C={D}: [1! (5−1−1)!/5!] *[v({D,B})−v({D})]=[3!/5!] *[2−1]=(6/120)*1=6/120
  C={E}: [1! (5−1−1)!/5!] *[v({E,B})−v({E})]=[3!/5!] *[2−1]=(6/120)*1=6/120

|C|=2:
  C={A,C}: [2! (5−2−1)!/5!] *[v({A,B,C})−v({A,C})]= [4/5!] *[0−2]=4/120*(−2)
  C={A,D}: [2! (5−2−1)!/5!] *[v({A,B,D})−v({A,D})]= [4/5!] *[1−2]=4/120*(−1)
  C={A,E}: [2! (5−2−1)!/5!] *[v({A,B,E})−v({A,E})]= [4/5!] *[0−0]=4/120*(0)
  C={C,D}: [2! (5−2−1)!/5!] *[v({B,C,D})−v({C,D})]= [4/5!] *[0−0]=4/120*(0)
  C={C,E}: [2! (5−2−1)!/5!] *[v({B,C,E})−v({C,E})]= [4/5!] *[1−2]=4/120*(−1)
  C={D,E}: [2! (5−2−1)!/5!] *[v({B,D,E})−v({D,E})]= [4/5!] *[1−0]=4/120*(1)

|C|=3:
  C={A,C,D}: [3! (5−3−1)!/5!] *[v({A,B,C,D})−v({A,C,D})]=[3!/5!] *[0−1]=6/120*(−1)
  C={A,C,E}: [3! (5−3−1)!/5!] *[v({A,B,C,E})−v({A,C,E})]=[3!/5!] *[0−1]=6/120*(−1)
  C={A,D,E}: [3! (5−3−1)!/5!] *[v({A,B,D,E})−v({A,D,E})]=[3!/5!] *[0−0]=6/120*(0)
  C=(C,D,E): [3! (5−3−1)!/5!] *[v({B,C,D,E})−v({C,D,E})]=[3!/5!] *[0−0]=6/120*(0)

|C|=4:
  C={A,C,D,E}: [4! (5−4−1)!/5!] *[v({A,B,C,D,E})−v({A,C,D,E})]=[24/120] *[0−0]=0

The final synergistic Shapley value for node B 510 may thus be computed by summing the individual values derived above in accordance with Eq. (1). This produces the value:

24/120+(0−6/120+6/120+6/120)+(−8/120−4/120+0+0+−4/120+4/120)+(−6/120−6/120+0+0)+0=24/120+6/120−12/120−12/120+0=6/120=1/20

The synergistic Shapley value for node B 210 is thus 1/20.

In our running example, four other iterations of the iterative procedure of steps 410-430 return synergistic Shapley values for nodes A, C, D, and E in the same manner. The method of FIG. 4 then ends and embodiments of the present invention continue with step 315 of FIG. 3.

What is claimed is:

1. A network-optimization system comprising a processor, a memory coupled to the processor, and a computer-readable hardware storage device coupled to the processor, the storage device containing program code configured to be run by the processor via the memory to implement a method for improving robustness of a cellular network, the method comprising:
   receiving an undirected graph that represents a topology of a cellular network, where the graph represents a pair of base stations of the network as a pair of nodes, and where the graph represents a communications path between the pair of base stations as an edge connecting the pair of nodes;
   deriving, for each node of the graph, a corresponding Shapley value of a plurality of Shapley values;
   identifying a first node of the graph as a censorious node if a Shapley value that corresponds to the first node exceeds a predetermined threshold value;
   updating the graph by rearranging one or more censorious nodes of the graph so as to reduce the Shapley values that correspond to the one or more censorious nodes; and
   directing a network-management entity, in response to the updating, to revise the cellular network such that the topology of the updated network matches the topology of the updated graph.

2. The system of claim 1, further comprising:
   repeating the deriving on two or more permutations of the undirected graph, where each permuted graph differs from the undirected graph only in the placement of macrocells previously identified as being censorious;
   identifying, as a function of the repeating, an updated set of censorious nodes for each permutation;
   selecting, from the two or more permutations, a least-censorious permutation, where the least-censorious permutation comprises fewer censorious nodes than any other permutation;
   replacing the revised topology with a permuted topology that corresponds to the least-censorious permutation; and
   directing the network-management entity to revise the cellular network such that the topology of the updated network matches the permuted topology.

3. The system of claim 1, further comprising:
   identifying that a failed base station of the cellular network is not operating;
   deleting from the graph a failed node that represents the failed base station;

deleting all edges of the graph that connect the failed node to other nodes of the graph; and repeating the deriving, identifying, updating, and revising.

4. The system of claim 1, further comprising:

identifying that a new base station has been added to the cellular network, where the new base station communicates with the cellular network through one or more new communications paths;

adding to the graph a new node hat represents the new base station;

adding to the graph a new edge that connects the new node to an existing node of the graph, where the new edge represents a communication path between the new base station and an existing base station of the cellular network; and repeating the deriving, identifying, updating, and revising.

5. The system of claim 1, where the deriving a Shapley value $\emptyset_i$ that corresponds to a node i of the graph comprises evaluating an equation of the form:

$$\emptyset_i = \sum_{C \in N-i} \frac{|C|!*(n-|C|-1)!}{n!} * \{v(C \cup \{i\}) - v(C)\}$$

where N is a set of all nodes of the graph, n is a number of nodes contained in set N, C is a subset of set N, |C| is a number of nodes contained in subset C, N–i is a subset of set N that does not include node i, and v(C) is a function that returns a value proportional to an amount of disruption to the cellular network resulting from a failure of all base stations of the cellular network that are represented by nodes of subset C.

6. The system of claim 5, where the value by function v(C) indicates how many base-station pairs of the cellular network are forced to exchange data through a longer path as a result of a failure of all base stations of the cellular network that are represented by nodes of subset C.

7. A method for improving robustness of a cellular network, the method comprising:

receiving an undirected graph that represents a topology of a cellular network, where the graph represents a pair of base stations of the network as a pair of nodes, and where the graph represents a communications path between the pair of base stations as an edge connecting the pair of nodes;

deriving, for each node of the graph, a corresponding Shapley value of a plurality of Shapley values;

identifying a first node of the graph as a censorious node if a Shapley value that corresponds to the first node exceeds a predetermined threshold value; and updating the graph by rearranging one or more censorious nodes of the graph so as to reduce the Shapley values that correspond to the one or more censorious nodes; and directing a network-management entity, in response to the updating, to revise the cellular network such that the topology of the updated network matches the topology of the updated graph.

8. The method of claim 7, further comprising:

repeating the deriving on two or more permutations of the undirected graph, where each permuted graph differs from the undirected graph only in the placement of macrocells previously identified as being censorious;

identifying, as a function of the repeating, an updated set of censorious nodes for each permutation;

selecting, from the two or more permutations, a least-censorious permutation, where the least-censorious permutation comprises fewer censorious nodes than any other permutation;

replacing the revised topology with a permuted topology that corresponds to the least-censorious permutation; and directing the network-management entity to revise the cellular network such that the topology of the updated network matches the permuted topology.

9. The method of claim 7, further comprising:

identifying that a failed base station of the cellular network is not operating;

deleting from the graph a failed node that represents the failed base station;

deleting all edges of the graph that connect the failed node to other nodes of the graph; and repeating the deriving, identifying, updating, and revising.

10. The method of claim 7, further comprising:

identifying that a new base station has been added to the cellular network, where the new base station communicates with the cellular network through one or more new communications paths;

adding to the graph a new node that represents the new base station;

adding to the graph a new edge that connects the new node to an existing node of the graph, where the new edge represents a communication path between the new base station and an existing base station of the cellular network; and repeating the deriving, identifying, updating, and revising.

11. The method of claim 7, where the deriving a Shapley value $\emptyset_i$ that corresponds to a node i of the graph comprises evaluating an equation of the form:

$$\emptyset_i = \sum_{C \in N-i} \frac{|C|!*(n-|C|-1)!}{n!} * \{v(C \cup \{i\}) - v(C)\}$$

where N is a set of all nodes of the graph, n is a number of nodes contained in set N, C is a subset of set N, |C| is a number of nodes contained in subset C, N–i is a subset of set N that does not include node i, and v(C) is a function that returns a value proportional to an amount of disruption to the cellular network resulting from a failure of all base stations of the cellular network that are represented by nodes of subset C.

12. The method of claim 11, where the value returned by function v(C) indicates how many base-station pairs of the cellular network are forced to exchange data through a longer path as a result of a failure of all base stations of the cellular network that are represented by nodes of subset C.

13. The method of claim 7, further comprising:

ordering the Shapely values derived for all nodes of the graph, where the ordering ranks the Shapely values corresponding to all nodes of the graph in decreasing order; and identifying as censorious nodes a subset of nodes of the graph that correspond to a predetermined number of the highest-ranked Shapely values.

14. The method of claim 7, further comprising providing at least one support service for at least one of creating, integrating, hosting, maintaining, and deploying computer-readable program code in the computer system, where the computer-readable program code in combination with the computer system is configured to implement the receiving, the deriving, the identifying, the updating, and the revising.

15. A computer program product, comprising a computer-readable hardware storage device having a computer-readable program code stored therein, the program code configured to be executed by a network-optimization system comprising a processor, a memory coupled to the processor, and a computer-readable hardware storage device coupled to the processor, the storage device containing program code configured to be run by the processor via the memory to implement a method for improving robustness of a cellular network, the method comprising:

receiving an undirected graph that represents a topology of a cellular network, where the graph represents a pair of base stations of the network as a pair of nodes, and where the graph represents a communications path between the pair of base stations as an edge connecting the pair of nodes;

deriving, for each node of the graph, a corresponding Shapley value of a plurality of Shapley values;

identifying a first node of the graph as a censorious node if a Shapley value that corresponds to the first node exceeds a predetermined threshold value; and updating the graph by rearranging one or more censorious nodes of the graph so as to reduce the Shapley values that correspond to the one or more censorious nodes; and directing a network-management entity, in response to the updating, to revise the cellular network such that the topology of the updated network matches the topology of the updated graph.

16. The computer program product of claim 15, further comprising:

repeating the deriving on two or more permutations of the undirected graph, where each permuted graph differs from the undirected graph only in the placement of macrocells previously identified as being censorious;

identifying, as a function of the repeating, an updated set of censorious nodes for each permutation;

selecting, from the two or more permutations, a least-censorious permutation, where the least-censorious permutation comprises fewer censorious nodes than any other permutation;

replacing the revised topology with a permuted topology that corresponds to the least-censorious permutation; and directing the network-management entity to revise the cellular network such that the topology of the updated network matches the permuted topology.

17. The computer program product of claim 15, further comprising:

identifying that a failed base station of the cellular network is not operating;

deleting from the graph a failed node that represents the failed base station;

deleting all edges of the graph that connect the failed node to other nodes of the graph; and repeating the deriving, identifying, updating, and revising.

18. The computer program product of claim 15, further comprising:

identifying that a new base station has been added to the cellular network, where the new base station communicates with the cellular network through one or more new communications paths;

adding to the graph a new node that represents the new base station;

adding to the graph a new edge that connects the new node to an existing node of the graph, where the new edge represents a communication path between the new base station and an existing base station of the cellular network; and repeating the deriving, identifying, updating, and revising.

19. The computer program product of claim 15, where the deriving a Shapley value $\varnothing_i$ that corresponds to a node i of the graph comprises evaluating an equation of the form:

$$\varnothing_i = \sum_{C \in N-i} \frac{|C|! * (n - |C| - 1)!}{n!} * \{v(C \cup \{i\}) - v(C)\}$$

where N is a set of all nodes of the graph, n is a number of nodes contained in set N, C is a subset of set N, |C| is a number of nodes contained in subset C, N−i is a subset of set N that does not include node i, and v(C) is a function that returns a value proportional to an amount of disruption to the cellular network resulting from a failure of all base stations of the cellular network that are represented by nodes of subset C.

20. The computer program product of claim 19, where the value returned by function v(C) indicates how many base-station pairs of the cellular network are forced to exchange data through a longer path as a result of a failure of all base stations of the cellular network that are represented by nodes of subset C.

* * * * *